Patented Nov. 2, 1943

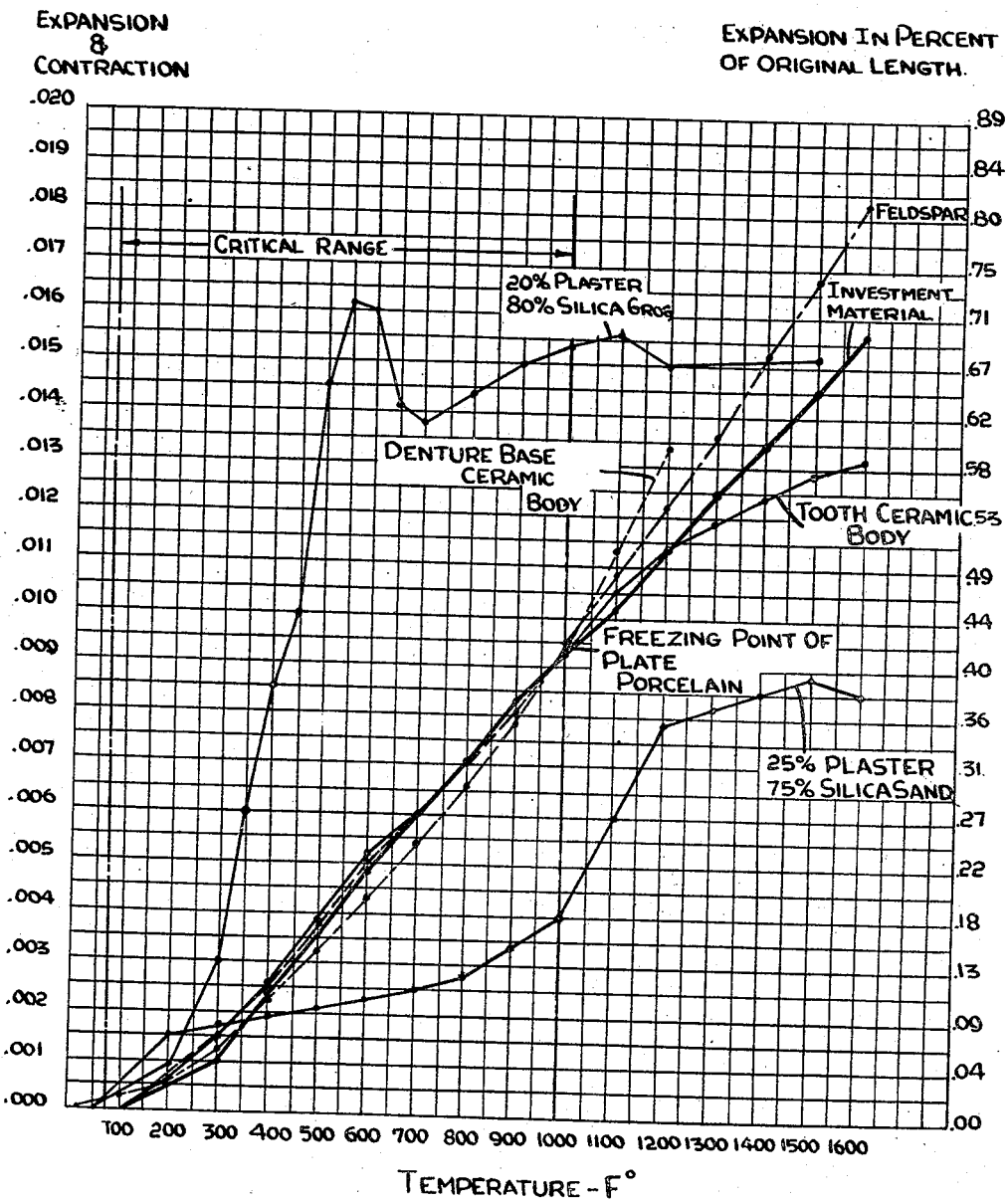

2,333,430

UNITED STATES PATENT OFFICE 2,333,430

DENTAL INVESTMENT MATERIAL

Pyungtoo William Lee and Charles Dietz, York, Pa., assignors to The Dentists' Supply Company of New York, New York, N. Y., a corporation of New York Original application May 31, 1939, Serial No. 276,644. Divided and this application July 9, 1940, Serial No. 344,500

3 Claims. (Cl. 22—188)

This invention relates to dental investment material, and has special reference to a material for use in the manufacture of all ceramic dentures.

This application is a division of our co-pending application, Serial No. 276,644, filed May 31, 1939, and entitled "All ceramic denture base with teeth, process and materials for producing same," issued August 25, 1942, Patent No. 2,293,908.

In the parent application, above identified, it was stated that in the dental art the molding or attaching of one vitreous body, such for instance as artificial teeth, to another of different composition, such as a denture base, at a temperature lower than the fusing temperature of the higher fusing body, has not been successful up to date, although the theory has been advanced, and such claim made in dental literature and in patent specifications.

In practice, no one heretofore has been able to produce two such different bodies of different compositions whose coefficients of expansion and contraction are alike, at least, through the critical range from atmospheric temperature to the plastic stage of the lower fusing material and from that plastic temperature to atmospheric temperature.

In the patent art, while patentees have claimed to have accomplished this result in materials having the same coefficients of expansion and contraction, in most cases, no formulae for the materials have been given, which would give this result, or if formulae have been given, these have been found to be unsuccessful in practice, and articles, and particularly dentures of this nature, have never, therefore, been produced commercially.

In practice it has been found that if the difference in the linear expansions and contractions of the two bodies, for instance, the artificial tooth and denture base ceramic material, is greater than .001″ per linear inch at any point between room temperature and the plastic stage of the lower fusing body, the two bodies cannot be united by fusion without producing checks and cracks in either one or the other, or both of such bodies.

It has also been found that after a tooth ceramic body and a denture base ceramic body have been produced, whose thermal contractions are in harmony through the critical range, that is, from the plastic state of the lower fusing body to room temperature, an ordinary, and heretofore successfully used, investment material could not be employed without seriously impairing the finished denture on account of pressures, strains, etc., caused by a thermal contraction of the investment material differing greatly from that of the bodies invested. It follows, therefore, that not only must the thermal contractions of the tooth ceramic body and denture base ceramic body be harmonious throughout the critical range, but that the material in which the bodies are invested must also have a thermal contraction through this critical range substantially identical with the thermal contractions of the bodies invested.

The object, therefore, of the present invention is to provide an investment material whose thermal contraction and expansion through the critical range is harmonious with the thermal contractions of the bodies invested.

A further object of the invention is to provide an investment material whose ingredients are so proportioned that a graph of its thermal contraction between approximately 1000° F. and room temperature is substantially a straight line.

According to the invention, feldspar, a form of calcium sulphate, and silica grog are compounded in such proportions that a graph of the thermal contraction of such a compound through the critical range of approximately 1000° F. to room temperature is substantially a straight line.

The drawing illustrates the thermal expansion and contraction curves of different materials and will be discussed later in connection with the description of the purposes and uses of the invention.

In the parent application, hereinbefore identified, the formula of a ceramic body for artificial teeth, suitable for incorporation into an all ceramic denture, was given, as follows:

| | Per cent |
|---|---|
| Feldspar | 70 to 90 |
| Amorphous silica | 10 to 30 |

It is, of course, to be understood that for the purpose of this application this formula is given as illustrative only, as variations in the formulae, both for the tooth ceramic body and denture base ceramic body, may be made as occasions warrant, and without affecting the scope of the present invention, except insofar as the claims may limit same.

The graph of the thermal expansion and contraction of a tooth ceramic body, according to the foregoing formula, is found on the drawing, and is illustrated by a full light line and marked "Tooth ceramic body."

In order to prevent the checking, cracking, etc. of the teeth and base of the all ceramic denture, a denture base ceramic body was required whose thermal expansion and contraction are substantially harmonious with the thermal expansion and contraction of the porcelain or ceramic body of the teeth. This is especially so through the critical range which comprises from atmospheric or room temperature up to the fusing temperature of the denture base ceramic body and/or vice versa. It is especially important that the contraction curves be in agreement from the softening point of the denture base material down through the hardening range to room temperature in order that no cracking or checking may occur, and in order that a perfect union between the two ceramic bodies may be effected.

The softening, maturing or fusing point of the denture base ceramic material may be considerably lower than the fusing point of the tooth ceramic material. In the parent application, the fusing point of the tooth material was approximately from 2300° F. to 2400° F., while the fusing point of the denture base material was approximately 1500° F. to 1600° F. The ceramic body of which the teeth are made, may, therefore, be termed a high fusing dental porcelain while the ceramic body of which the denture plate or base is made is between porcelain and glass, probably being closer to glass than to porcelain. The denture base ceramic body, which was developed, and which produces a thermal expansion and contraction curve, such as that shown in dotted lines in the drawing and marked "Denture base ceramic body," has the following formula:

| | Per cent |
|---|---|
| Feldspar | 65 to 80 |
| Amorphous silica | 10 to 20 |
| Borax glass | 5 to 15 |

Under proper control of temperature and time of firing, the tooth and denture base ceramic bodies of the foregoing formulae will expand and contract in substantial harmony.

In the parent application above identified, the process of forming the all ceramic denture was illustrated and described. It was shown that before placing investment material in the flask, in which the bodies were fired, the side walls of the same were lined with material which would burn out, compress, or otherwise allow for the relative lateral expansion and contraction of the investment material and casing without exerting any pressures or strains on the investment material or article being invested. This is the subject-matter of a separate and co-pending application of Pyungtoo William Lee, one of the applicants herein, Serial No. 247,483, filed December 23, 1938.

Dental investment compositions generally contain a considerable proportion of quick setting material, such as gypsum or plaster of Paris, together with silicious materials, such as silica-sand and/or fire clay grog. In the drawing, there is shown a thermal expansion curve of an investment material having 20% plaster of Paris and 80% silica grog. This is identified by the wording, "20% Plaster 80% silica grog." The drawing also shows another thermal expansion curve of an investment material having 25% plaster of Paris and 75% silica sand. This is identified by the wording, "25% Plaster 75% silica sand." The thermal expansion curve of gypsum silica mixtures, as illustrated, is generally characterized by certain sharp breaks due to silica inversions and to dehydration of the sulphate. It has been shown that with the formulae given the thermal expansion and contraction curves of the new tooth ceramic body and of the new denture base ceramic body have been brought into practical conformity, whereas the curves of the commercial investment materials, as illustrated in the drawing, are widely divergent from the curves of the tooth and base ceramic materials, both of which are shown in the drawing. A denture base formed in investments, such as those indicated, would be badly cracked when cooled.

We have found that feldspar has a very uniform curve of expansion. A thermal expansion and contraction curve of feldspar, marked "Feldspar" and shown in dot-and-dash lines, is illustrated in the drawing. Experiment and research prove that an investment compound of the following general proportions would give a thermal contraction curve in substantial harmony with the curves of the tooth and denture base ceramic bodies hereinbefore described. The formula for this new investment material is as follows:

| | Per cent |
|---|---|
| A type of calcium sulphate binder (Hydrocal) | 10 to 25 |
| Feldspar | 30 to 80 |
| Silica grog | 10 to 45 |

Although we prefer to employ a calcium sulphate binder, any suitable binding cement which sets in the cold by reason of chemical action may be used.

The thermal contraction curve of an investment material, according to the foregoing formula, is shown in the drawing by a heavy line, and marked "Investment material."

We find, therefore, that through the critical range, which we have before discussed, the linear thermal expansions and contractions of the tooth ceramic body, the denture base ceramic body and and the investment material are always controlled so as to never vary one from the other more than one-half of one-thousandth of an inch per linear inch, or less than one-tenth of one per cent.

Of course, the investment compound illustrated and discussed herein may be modified in various ways without departing from the invention herein set forth and hereafter claimed.

The invention is hereby claimed as follows:

1. A dental investment material comprising ingredients in the following approximate proportions: calcium sulphate binder 10 per cent to 25 per cent, feldspar 30 per cent to 80 per cent, and silica grog 10 per cent to 45 per cent.

2. A dental investment material having a thermal contraction substantially harmonius with a ceramic body at least from 1000° F. to room temperature, the ceramic body comprising the following ingredients: feldspar 65 to 80 per cent, amorphous silica 10 to 20 per cent, and borax glass 5 to 15 per cent, the dental investment material comprising ingredients in the following approximate proportions: calcium sulphate binder 10 to 25 per cent, feldspar 30 to 80 per cent, and silica grog 10 to 45 per cent.

3. A dental investment material having a thermal contraction substantially harmonius at least from 1000° F. to room temperature with a ceramic body comprising feldspar 70 to 90 per cent and amorphous silica 10 to 30 per cent, the dental investment material comprising ingredients in the following approximate proportions: calcium sulphate binder 10 to 25 per cent, feldspar 30 to 80 per cent, and silica grog 10 to 45 per cent.

PYUNGTOO WILLIAM LEE.
CHARLES DIETZ.